United States Patent
Hartmann et al.

(10) Patent No.: US 6,633,589 B1
(45) Date of Patent: *Oct. 14, 2003

(54) SWITCHING APPARATUS FOR USE IN TELEPHONE HOUSE WIRING

(75) Inventors: James Joseph Hartmann, Indianapolis, IN (US); Thomas Anthony Stahl, Indianapolis, IN (US)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/547,746

(22) Filed: Apr. 12, 2000

Related U.S. Application Data

(63) Continuation of application No. 09/374,400, filed on Aug. 13, 1999, which is a continuation of application No. 08/744,391, filed on Nov. 7, 1996, now Pat. No. 5,960,066.

(51) Int. Cl.[7] ............................................. H04J 15/00
(52) U.S. Cl. ...................... 370/493; 370/494; 370/497
(58) Field of Search ......................... 370/488, 494–496, 370/524, 493, 497; 380/260, 9; 375/222; 333/17.2; 379/198, 200, 157

(56) References Cited

U.S. PATENT DOCUMENTS

| | | | |
|---|---|---|---|
| 3,781,472 A | 12/1973 | Goode et al. ................. 178/22 |
| 4,021,759 A | * 5/1977 | Campi ....................... 333/17.2 |
| 4,184,054 A | * 1/1980 | Shibata et al. ............... 379/157 |
| 4,346,264 A | 8/1982 | Sharvit ....................... 379/198 |
| 4,401,854 A | * 8/1983 | Steele ......................... 380/260 |
| 4,425,661 A | * 1/1984 | Moses et al. ................. 370/496 |
| 4,459,434 A | 7/1984 | Benning et al. ............. 379/160 |
| 4,482,787 A | * 11/1984 | Sagara et al. ............... 379/200 |
| 4,538,031 A | 8/1985 | Benning et al. ....... 379/102.06 |
| 4,583,219 A | 4/1986 | Riddle |
| 4,628,153 A | 12/1986 | Daly .......................... 379/163 |
| 4,706,244 A | 11/1987 | Watson et al. ............... 379/160 |
| 4,739,205 A | 4/1988 | Fuhrman ..................... 370/479 |
| 4,776,006 A | 10/1988 | Comerford et al. ......... 379/159 |
| 4,785,448 A | 11/1988 | Reichert et al. ......... 379/93.14 |
| 4,857,716 A | * 8/1989 | Gombrich et al. ..... 235/462.15 |
| 4,882,751 A | * 11/1989 | Kotzin et al. ................... 380/9 |
| 4,901,342 A | 2/1990 | Jones ...................... 379/93.05 |
| 5,010,399 A | 4/1991 | Goodman et al. ....... 379/90.01 |
| 5,125,026 A | 6/1992 | Holcombe .................. 379/387 |
| 5,184,345 A | 2/1993 | Sahni ......................... 370/264 |
| 5,467,061 A | 11/1995 | Aden et al. ............... 333/24 R |
| 5,513,174 A | 4/1996 | Punj |
| 5,596,631 A | 1/1997 | Chen .......................... 379/160 |
| 5,752,195 A | 5/1998 | Tsuji et al. .................. 455/462 |
| 5,949,763 A | 9/1999 | Lund .......................... 370/261 |
| 5,960,066 A | * 9/1999 | Hartmann et al. .......... 370/488 |
| 5,991,311 A | * 11/1999 | Long et al. ................. 370/524 |
| 6,038,300 A | 3/2000 | Hartmann et al. .......... 379/177 |
| 6,320,900 B1 | 11/2001 | Lin ............................. 375/219 |
| 6,393,050 B1 | 5/2002 | Lin ............................. 375/219 |

FOREIGN PATENT DOCUMENTS

| | | |
|---|---|---|
| WO | WO85/01626 | 4/1985 |
| WO | WO93/11637 | 6/1993 |

\* cited by examiner

*Primary Examiner*—Salvatore Cangialosi
(74) *Attorney, Agent, or Firm*—Steve Mendelsohn; Yuri Gruzokov

(57) ABSTRACT

A controller for residential telephone wiring. Apparatus associated with the controller provides multiple communication channels on ordinary residential telephone wiring. The controller (1) routes incoming calls to a selected telephonic device within the residence, (2) routes outgoing calls to a free external line servicing the residence, and (3) routes calls within the residence from one telephonic device to another.

18 Claims, 12 Drawing Sheets

SWITCHING APPARATUS FOR USE IN TELEPHONE HOUSE WIRING

This is a continuation of 09/374,400 filed on Aug. 13, 1999, which is a continuation of 08/744,3931, now U.S. Pat. No. 5,960,066. This patent is hereby incorporated by reference. Also incorporated by reference is U.S. Pat. No. 6,038,300.

The invention concerns use of existing four-wire telephone wiring, as contained in many houses, to carry, for example, two voice channels and two data channels.

BACKGROUND OF THE INVENTION

The wiring in most existing homes generally takes the form of a four-wire set, in which one pair of wires carries one telephone channel, and the other pair, if desired, carries a second channel.

Other types of buildings, such as commercial office buildings, contain similar telephone cable, which is used not only to support telephone service, as in a residence, but also to support a data network, in which computers communicate with each other. However, using the telephone cable to support the data network requires additional equipment, which may be expensive, and may require a system administrator for support.

PRIOR ART DEVICE

U.S. Pat. No. 4,578,540, issued on Mar. 25, 1986, to Borg, Halas, Mattes, McLear, and White and entitled "Telecommunications Systems," discloses a controller which is interposed between an incoming telephone line and the telephones to which the incoming line provides service. The arrangement described by Borg, et al., (hereinafter, "Borg") is shown in FIG. 1.

As seen in FIG. 1, Borg's system contains a ring detector 140 for detecting a ring signal provided by the telephone central office. When a ring signal is detected, a data processor 110 is informed of the ring signal. The processor 110 actuates a ring generator 119 which issues a ring signal to all telephones connected to the controller. These telephones are indicated by the phrase "TOWARD EXTENSION TELEPHONES" located at the upper right part of FIG. 1.

When one of these telephones answers the ring, as by going off-hook, for example, that fact is detected by a line-current detector 118. In response, the processor 110 closes relays SHM1, SHM2 (both at the upper left), and relays COM and PHM (both just below the phrase "FIG. 1"). At this time, the off-hook-telephone is now connected to the incoming call.

The Borg arrangement provides a number of desirable features. For example, a user of the controller can store telephone numbers in a memory, labeled RAM 111. When an incoming call is received, the processor 110 answers the call with a message stating "This is the Jones residence. Please dial your telephone number to leave a message." When the caller enters the telephone number, the processor 110 compares the number with those in RAM 111. If no match is found, the processor does not actuate the ring generator 119, and the telephones controlled by the controller do not ring. The incoming call is blocked. This feature prevents receipt of unwanted telephone calls.

Moreover, "distinctive ringing" can be implemented. In addition to storing the telephone numbers as described immediately above, a user can associate data which indicates a ringing pattern with each telephone number. When an incoming call is received and the caller enters a telephone number, the processor 110 looks for the number in the RAM 111. When the number is found, the processor 110 looks for the ring pattern associated with that number, and actuates ring generator 119 accordingly. For example, a call from Adams may result in the ring pattern of "LONG, SHORT, LONG." "Distinctive ringing" can be used in connection with an intercom mode, which is provided by the controller. A person takes a telephone controlled by the controller off-hook. The processor detects the off-hook status, through line-current detector 118, and waits for a signal. If the person presses the "#" key of the telephone, the processor then knows that the person wishes to place a call in intercom mode. The processor then waits for a key-press sequence, which identifies a recipient of the intercom call. When the key-press sequence is received, the processor looks up a ring sequence associated with the sequence, in RAM 111. The processor rings all telephones with the ring sequence, thus summoning the person who has been assigned that sequence.

The controller can issue Dual-Tone, Multi-Frequency (DTMF) signals, using ADDRESS OR COMMAND SIGNAL GENERATOR 115. These signals can be issued to either the telephone central office or the extension telephone sets. DTMF signals are those generated by the keys of a standard keypad telephone. The DTMF signaling convention is described in Reference Data for Engineers: Radio. Electronics. Computers and Communications, E. C. Jordan, editor, 7th edition, 1985, Howard K. Sams & Co., page 38–16. Finally, the processor 110 can control a PERIPHERAL DEVICE INTERFACE 114. In general, this INTERFACE 114 is a data port which can be used to communicate with numerous devices, such as burglar alarms, fire alarms, utility meter-reading equipment, and so on.

As indicated above, the Borg arrangement provides a number of significant advantages. Disadvantageously, however, Borg does not fully utilize the bandwidth available in the telephone lines supplied to his device.

SUMMARY OF THE INVENTION

According to the present invention, advances are made in the prior art by a system in which two pairs of telephone cable are used to support four communication channels: two voice channels and two data channels. A controller can route data and voice calls among devices wishing to use the channels.

DETAILED DESCRIPTION OF THE INVENTION

Figure 2:
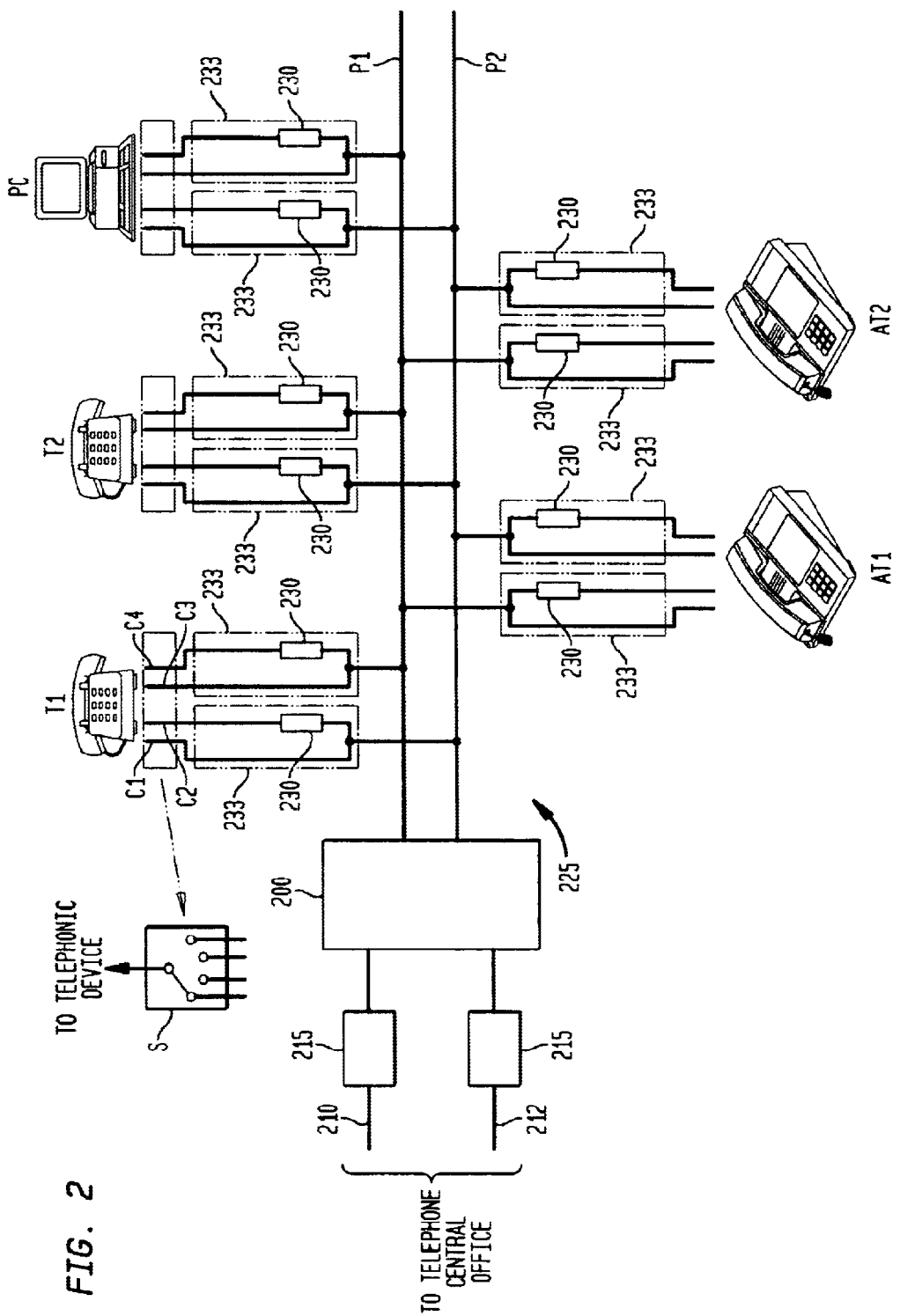
FIG. 2 illustrates various telecommunications devices connected to the cable 3 of FIG. 1, which is designated as wire-pairs P1 and P2 in FIG. 2.

FIG. 2 illustrates a controller 200, constructed in accordance with the present invention, for use in an arrangement such as the one disclosed by Borg, et al., in U.S. Pat. No. 4,578,540, the disclosure of which is expressly incorporated herein by reference. The controller 200 is connected to one or two external telephone lines 210 and 212, which lead to the telephone central office (not shown). These lines, in many instances, will provide a standard voice-grade telephone channel of bandwidth ranging from approximately zero Hz to 3500 Hz.

Upstream of the controller 200 (that is, between the controller 200 and the telephone central office), in each line, is a filter 215 which passes the voice signal, and blocks signals above the bandwidth of the voice channel. For example, the filter 215 may pass signals below 3500 Hz and block signals above 10,000 Hz (ie, 10K Hz).

Downstream of the controller 200 is standard telephone house wiring 225. This wiring can take the form of four-wire telephone cable, commonly designated as "D-station wire." This four-wire cable can be grouped into two pairs, indicated as P1 and P2.

The inventors have demonstrated that each pair of wires P1 and P2 has a usable bandwidth around 500K Hz. In accordance with an illustrated embodiment of the present invention, these bandwidth bands are divided into four channels using filters 230. Each filter 230 can take, for example, the form of a high-pass filter which passes frequencies above 10K Hz. Thus, each device indicated by dashed box 233 derives two channels from a pair of wires, P1 and P2. These channels are labeled C1 through C4 for device T1.

The frequency 10K Hz is chosen to accommodate the roll-off characteristics of inexpensive filters. That is, in general, at some frequency above 3500 Hz, the filter starts blocking signals. The amount of blocking increases as frequency increases until, at 10K Hz, the stop-band of the filter is reached, which blocks significant signal energy. Thus, a simple, inexpensive high-pass filter having a cut-off frequency of 10K Hz can be used to generate the data channel. Of course, other, sharper, filters can be used.

Three types of telephonic device are shown in FIG. 2: ordinary telephones T1 and T2, a computer PC, and advanced telephonic devices AT1 and AT2. The latter, AT1 and AT2, may take the form of devices which receive and store digital data, such as facsimile machines or digital picture telephones.

Figure 3:
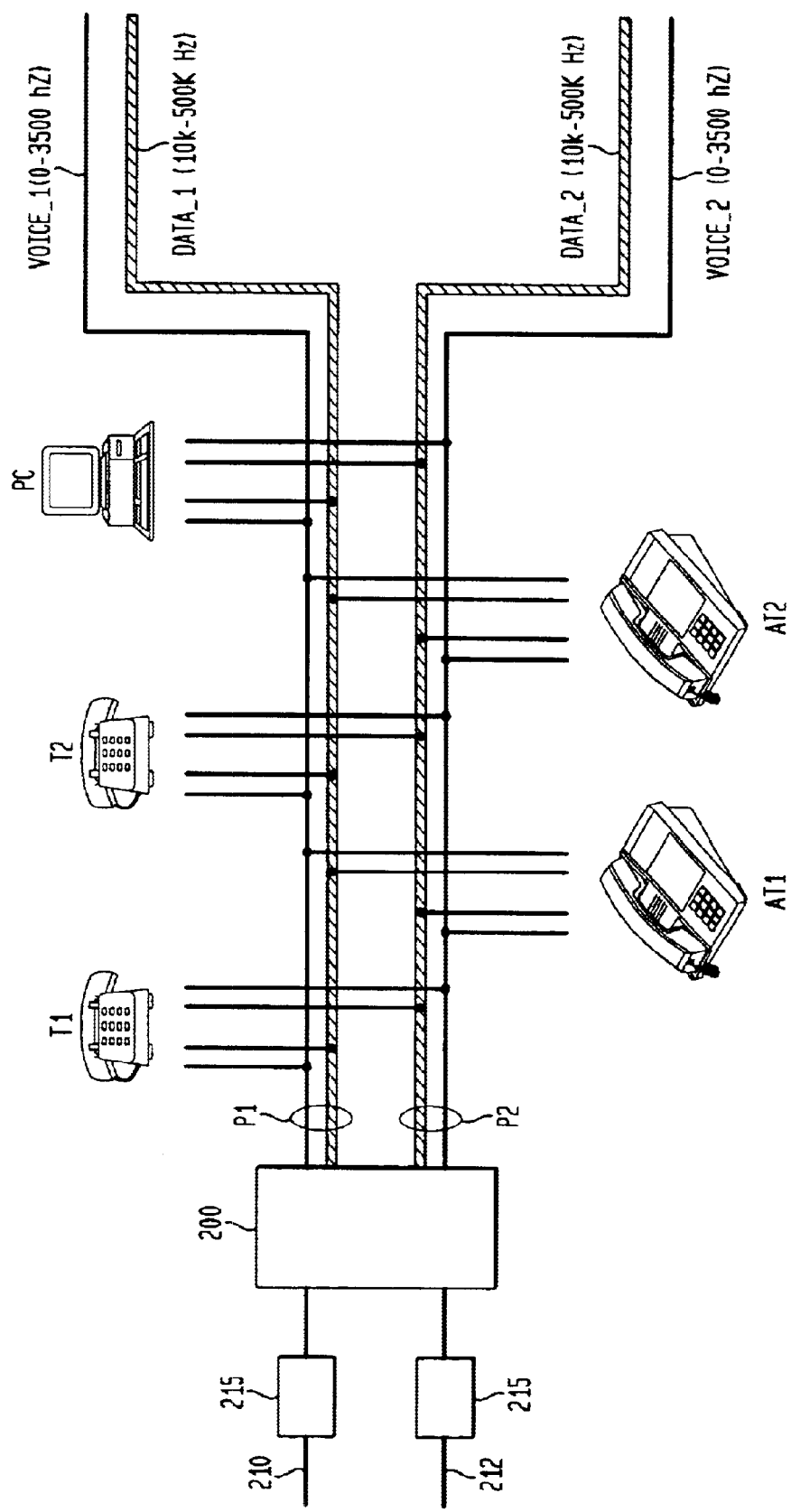
FIG. 3 illustrates four channels derived from the two pairs P1 and P2 of FIG. 2 in accordance with the present invention.

With this arrangement, the situation becomes as shown in FIG. 3. Each device has access to all four channels: two voice channels and two data channels. (The channels should not be confused with the individual, physical wire-pairs P1 and P2 in FIG. 2. Each wire-pair provides the physical transmission line for carrying two channels, as explained above.)

Figure 4:
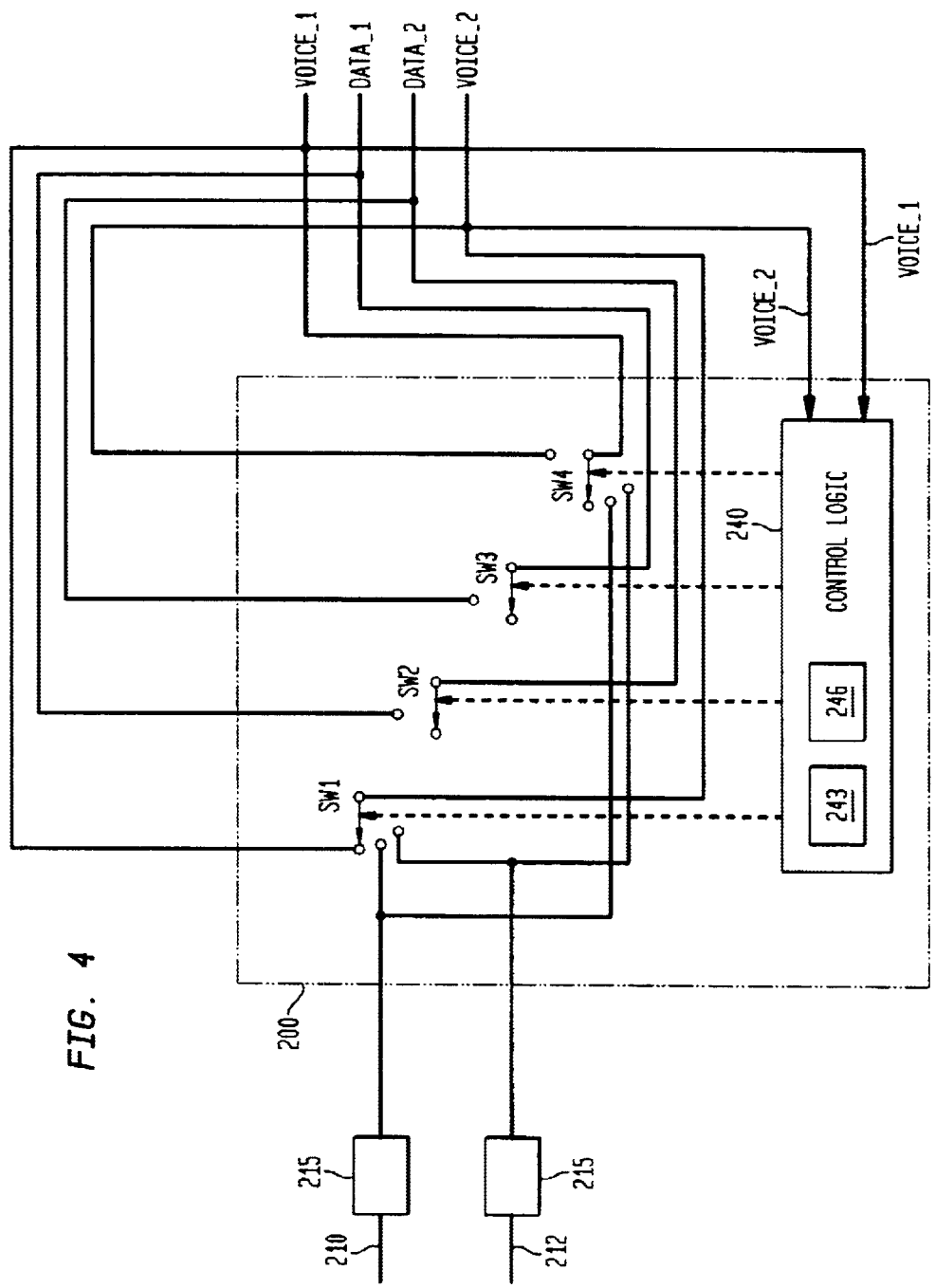
FIG. 4 is an idealized representation of a portion of the controller 2 of FIG. 2.

The telephonic devices can communicate with each other, without assistance, or knowledge of, the telephone central office, because the controller 200 isolates pairs P1 and P2 from the central office. FIG. 4 is a schematic representation which illustrates part of the operation of the controller 200. The four channels (VOICE_1, DATA_1, VOICE_2, and DATA_2) can be interconnected with each other, and with the external telephone lines 210 and 212, by the indicated possible positions of switches SW1–SW4. These switches are under control of control logic 240. In general, all interconnections are possible, with the exception that data channels cannot be connected to voice channels, nor to external lines 210 and 212.

The control logic 240 is commanded by Dual-Tone Multi-Frequency signals (DTMF), carried by the voice channels, VOICE_1 and VOICE_2. Operation in different modes will be illustrated by several examples.

EXAMPLE 1

The control logic 240 in FIG. 4 receives signals in the following format:

ATTENTION, CALLING DEVICE, DESTINATION DEVICE.

The ATTENTION signal is a unique signal, not used in dialing ordinary telephone numbers, which informs the control logic 240 that internal routing of a call is being requested. For example, the "#" DTMF signal (referring to the DTMF signal produced by the "#" key on a touch-pad) may act as the ATTENTION signal.

Each device is identified by a code. The control logic 240 contains memory 243 which stores the code of each device, together with (a) information identifying the channels to which that device has access and (b) the type of channel (voice or data) which the device uses.

For example, the code for telephone T1 in FIG. 2 may be the "1" DTMF signal. Telephone T1 may have access to both VOICE_1 and VOICE_2 channels. Telephone T1 uses voice channels. The information of the previous three sentences is stored in memory 243.

The CALLING DEVICE signal is the code of the device requesting that a call be placed. The DESTINATION DEVICE signal identifies the code of the device with which the initiating device wishes to connect. For example, if telephone T1 wishes to call telephone T2, and if the code of T2 is "2", then telephone T1 would issue the following sequence of signals:

"#" "1" "2"

The control logic 240 in FIG. 4 receives the "#" signal, and thereby learns that the next two signals will identify two devices to be connected together. After receiving the identity of the two devices, the control logic 240 examines a status table 246, which holds information indicating which channels are presently in-use. Based on the memory 243, the control logic 240 identifies the type of channel required and, based on the status table 246, the control logic 240 selects a channel of that type which is free. The control logic 240 issues a ring signal on the selected channel, and actuates one of the switches SW1–SW4 in FIG. 4, if required. (If telephones T1 and T2 are both connected to the same channel, such as VOICE_1, then no actuation of a switch is required.)

EXAMPLE 2

Assume again that a user of telephone T1 in FIG. 3 wishes to call telephone T2. Assume that telephone T1 is a single-channel telephone, connected to pair P1 in FIG. 2, and that telephone T2 is also a single-channel telephone, but connected to pair P2. The user of T1 issues the sequence

"#" "1" "2"

which identifies the caller as device number 1 and the target as device number 2.

The control logic 240 in FIG. 4, based on memory 243 and status table 246, determines that switch SW1 must connect channel VOICE_1 with channel VOICE_2, and makes the connection. The control logic 240 issues a ring signal to channel VOICE_2.

EXAMPLE 3

Assume that (a) the advanced device AT1 in FIG. 2 is a facsimile (FAX) machine, (b) the computer PC in FIG. 2 wishes to retrieve a FAX message stored in device AT1, while, at the same time, (c) telephones T1 and T2 are maintaining a conversation, as in Example 1. Computer PC issues the following sequence:

"#" "3" "4"

indicating that computer PC (device number 3) wishes to connect with device number 4 (ie, device AT1).

The control logic 240 in FIG. 4, based on memory 243 and status table 246, determines that a data connection is required, rather than a voice connection, and actuates the proper switches SW1–SW4 in FIG. 4, and, if required, issues a ring signal, so that the FAX machine learns that the computer wishes to communicate with it.

After the proper switches have been actuated, the two telephones T1 and T2 maintain their conversation, as before, on a voice channel, while the FAX machine (ie, AT1) and the PC transfer data on a data channel.

The original data which the FAX machine received was in facsimile-data-format, and carried by a telephone line. It is possible to program the control logic 240 so that, in this example, it connects the FAX machine with the PC by a voice channel, rather than a data channel, to effect the data transfer in the same format as received by the FAX machine, namely, facsimile-data-format.

Further, the three-code sequence (ATTENTION, CALLING DEVICE, DESTINATION DEVICE) can be expanded to include a code indicating the type of channel requested. In this example, the computer may request a data channel, or may request a voice channel.

EXAMPLE 4

The user of telephone T1 wishes to make a call to an external telephone. The user dials an ordinary telephone number, using channel VOICE_1. The control logic 240 recognizes the ordinary telephone number, and connects channel VOICE_1 to line 210, using switch SW4.

The control logic 240 in FIG. 4 can connect any of the four channels VOICE_1, VOICE_2, DATA_2, and DATA_2 with any matching channel. (Voice matches voice, and data matches data.) In addition, the control logic can connect the channels VOICE_1 and VOICE_2 with external telephone lines 210 and 212.

Single-line telephones, and other devices which cannot ordinarily handle two channels, can be equipped with switch S in FIG. 4A, which allows them to select pair P1 or P2. The switch S is manually actuated, like the buttons on a multi-line telephone.

Therefore, in the embodiment described above, two channels are made available on each pair P1 and P2. To select a channel, the individual telephonic devices (a) are physically connected to one, or more, of the channels C1–C4 in FIG. 2, which the device uses; (b) are connected to a switch S in FIG. 2, which allows a user to manually select a channel; (c) contain their own switching system; or (d) a combination of the preceding. A controller 200 routes calls. Filters 215 block signals above the voice band from reaching external telephone cables 210 and 212.

Figure 5:
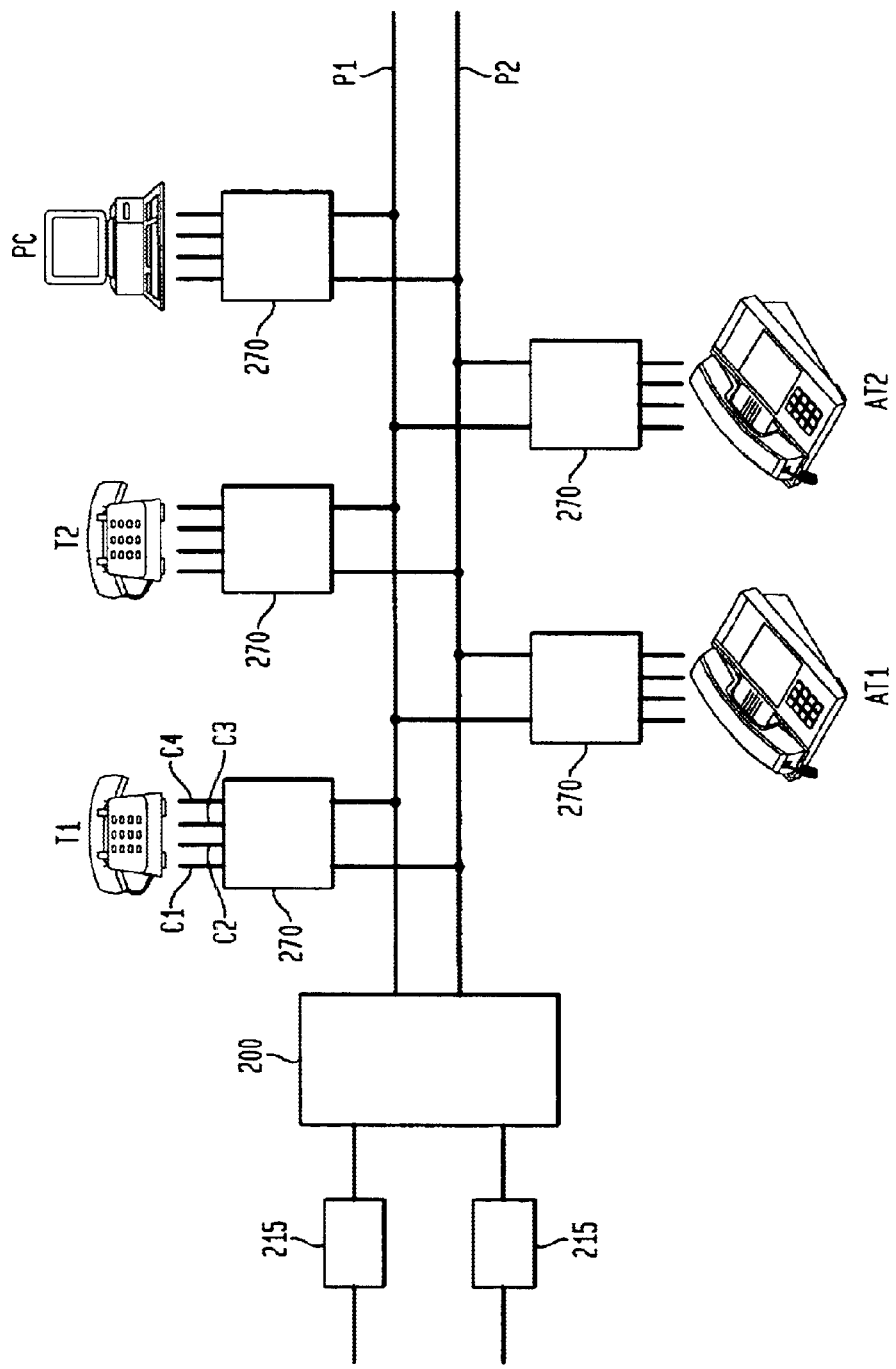
FIG. 5 illustrates another form of the invention.
Figure 6:
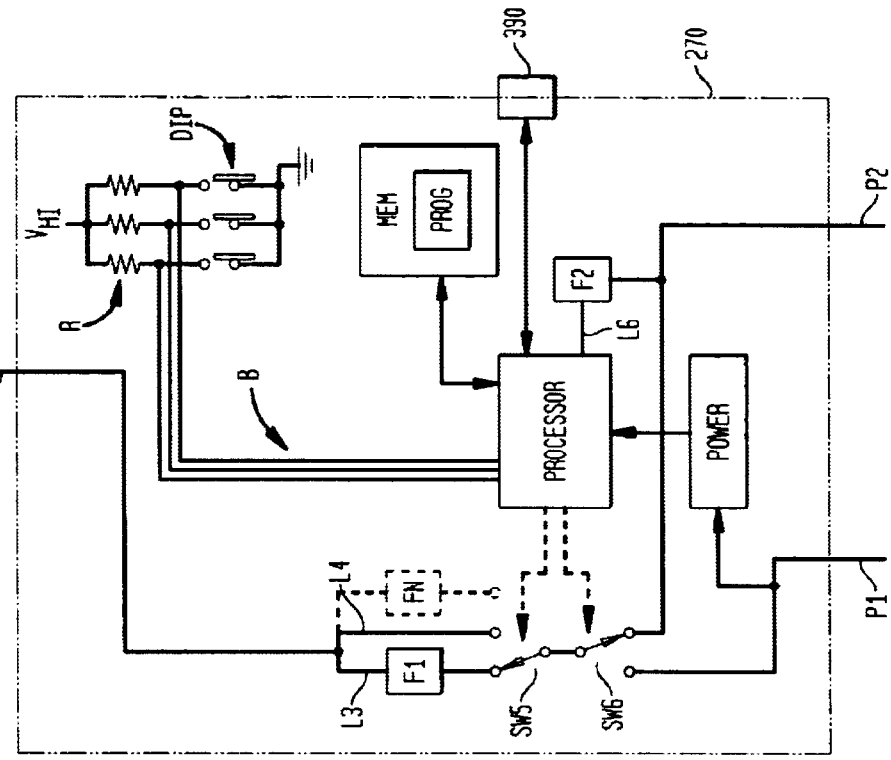
FIG. 6 illustrates details of a switching adjunct 270, shown in FIG. 5.

In the discussion above, devices 233 in FIG. 2 were assumed to be passive. In another form of the invention, shown in FIG. 5, an active device 270, termed a "switching adjunct," replaces device 233 of FIG. 2. Each switching adjunct derives four channels (or a larger number, in other embodiments) from the two pairs P1 and P2, indicated as C1 through C4 in FIG. 5. FIG. 6 illustrates a switching adjunct in greater detail.

The switching adjunct connects to pairs P1 and P2, as indicated. A power supply labeled POWER, and energized by pair P1, produces regulated power for internal components, such as a microprocessor labeled PROCESSOR. The PROCESSOR controls switches SW5 and SW6, which determine whether a telephonic device, which is connected to line L5, but not shown, receives a signal on line L3 or L4, and whether that signal is derived from pair P1 or P2. Line L3 contains a high-pass filter F1, analogous to filter 230 in FIG. 2.

Figure 6A:
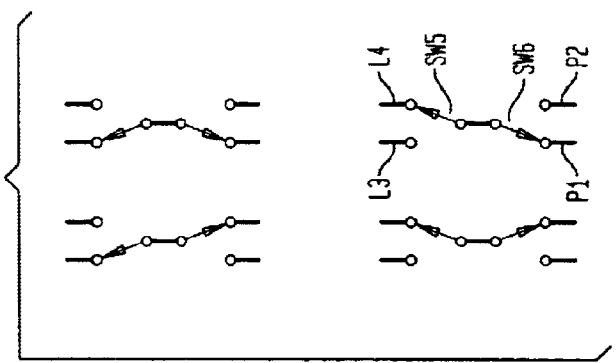
FIG. 6A illustrates four states of switches SW5 and SW6 of FIG. 6.

Thus, four channels can be derived from pairs P1 and P2, depending on the states of switches SW5 and SW6. FIG. 6A illustrates the four possible states. In the lower part of the Figure, switch SW5 connects to line L4 (also shown in FIG. 6). With this state of SW5, two channels are available, depending on the position of switch SW6. These two channels will provide two voice-grade channels.

In the upper part of FIG. 6A, switch SW5 connects to line L3 (also shown in FIG. 6). With this state of SW5, two additional channels will be provided, again depending on the position of switch SW6. These two channels will be filtered by filter F1 in FIG. 6, which blocks frequencies below 10K Hz. These channels will be data channels, occupying a bandwidth from about 10K Hz to about 500K Hz.

The PROCESSOR in FIG. 6 controls switches SW5 and SW6, based on signals received on line L6. These signals are received from controller 200 in FIG. 2. In FIG. 6, filter F2 may be interposed in line L6. If so, filter F2 defines the bandwidth which carries these signals. If filter F2 is absent, then these signals will occupy the voice-band channel of pair P2.

The PROCESSOR also has access to a bus B, which carries a data word which identifies the adjunct 270. This data word can be generated by a dip-switch DIP, which is illustrated as containing three individual switches. When a switch is open, a resistor R pulls the respective line in bus B to a logic ONE. When a switch is closed, the respective line is pulled to a logic ZERO. Thus, the DIP switch stores a 3-bit number, which can be changed by a user.

The PROCESSOR has access to memory MEM, which contains a program PROG which the PROCESSOR runs. A flow chart of the program is given in FIG. 7. Initially, when an adjunct 270 in FIG. 6 is carrying no telephone calls, its switches SW5 and SW6 are placed in a default position, wherein a DC signal can pass from line L5 to, for example, pair P2. This DC connection allows the controller 200 in FIG. 2 to monitor the line current on pair P2, and detect when the telephonic device connected to line L5 in FIG. 6 goes off-hook.

If the switches were not placed in a default position, but allowed to assume random states, switch SW5 may connect to filter F1. That filter may be a high-pass filter, and may block a DC signal, which would prevent the controller 200 in FIG. 2 from detecting the off-hook condition.

Figure 7:
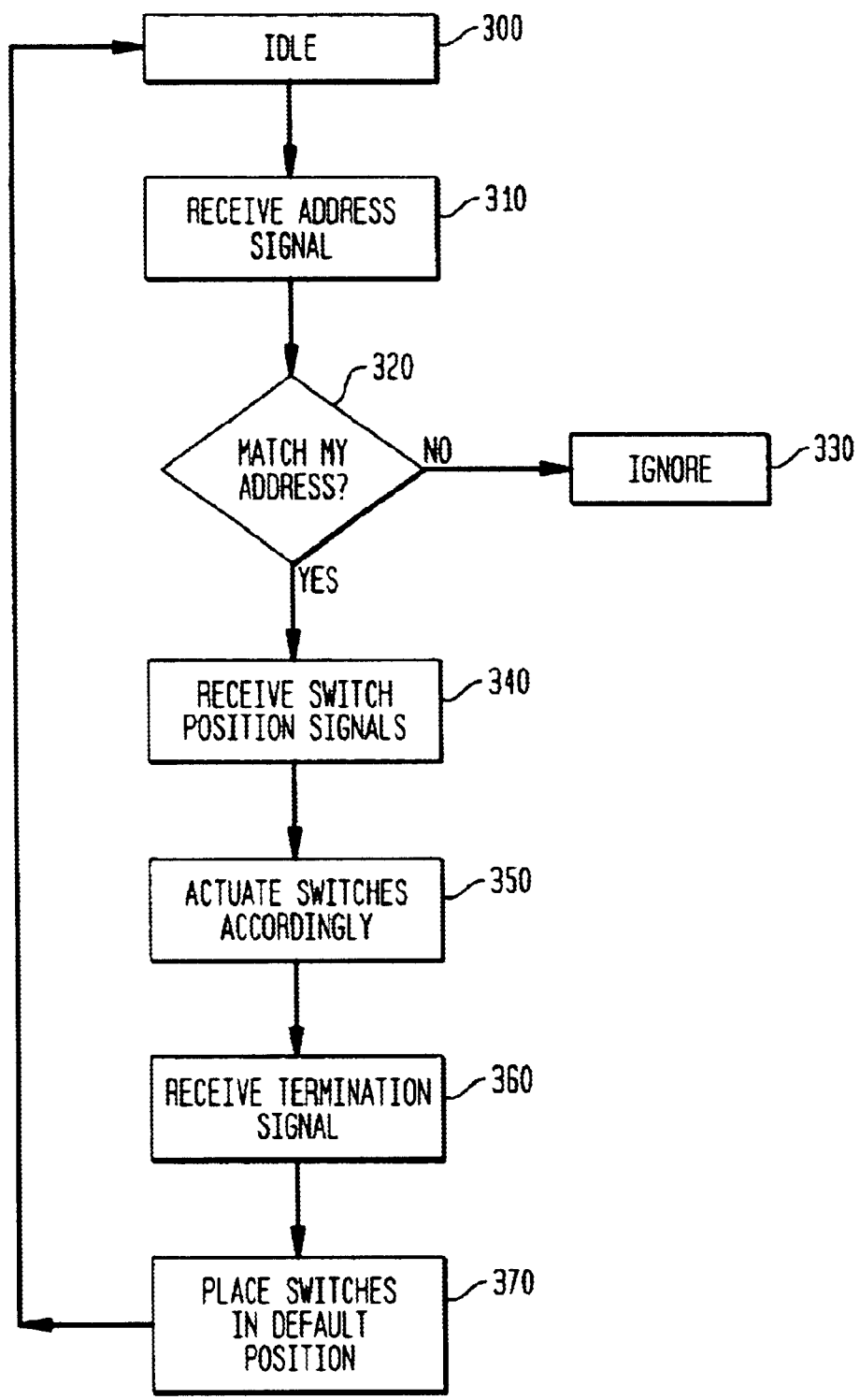
FIG. 7 is a flow chart illustrating logic executed by one form of the invention.

Thus, with switches SW5 and SW6 in a default position, the adjunct 270 waits in an idle state, indicated by block 300 in FIG. 7. When a call is to be directed to an adjunct, the controller 200 in FIG. 2 transmits the address of the adjunct on pair P2, shown in FIG. 6. The PROCESSOR receives the address signal, and compares the address with that on bus B, as indicated by blocks 310 and 320 in FIG. 7.

If the addresses do not match, the PROCESSOR ignores the address signal, as indicated by block 330. If the addresses do match, then the PROCESSOR accepts switch position signals, sent by controller 200, on pair P2. These switch position signals indicate the positions to which switches SW5 and SW6 are to be set. The PROCESSOR sets the switches accordingly, as indicated in block 350. Now, line L5 is connected to one of the channels indicated in FIG. 6A.

Later, when the call is to terminate, the controller 200 in FIG. 2 transmits a termination signal to the adjunct. At least two types of termination signal can be sent. In one type, each adjunct is assigned a unique termination signal. In this case, even though all adjuncts 270 in FIG. 5 will hear the unique termination signal, only the adjunct assigned to it will respond.

In the other type of termination signal, an address signal is transmitted first. The PROCESSOR analyzes the address signal in the manner of blocks 310 and 320 in FIG. 7. If the address signal identifies that particular PROCESSOR, then the processor responds to the termination signal, by placing switches SW5 and SW6 in their default positions, as indicated by block 370.

Figure 11:
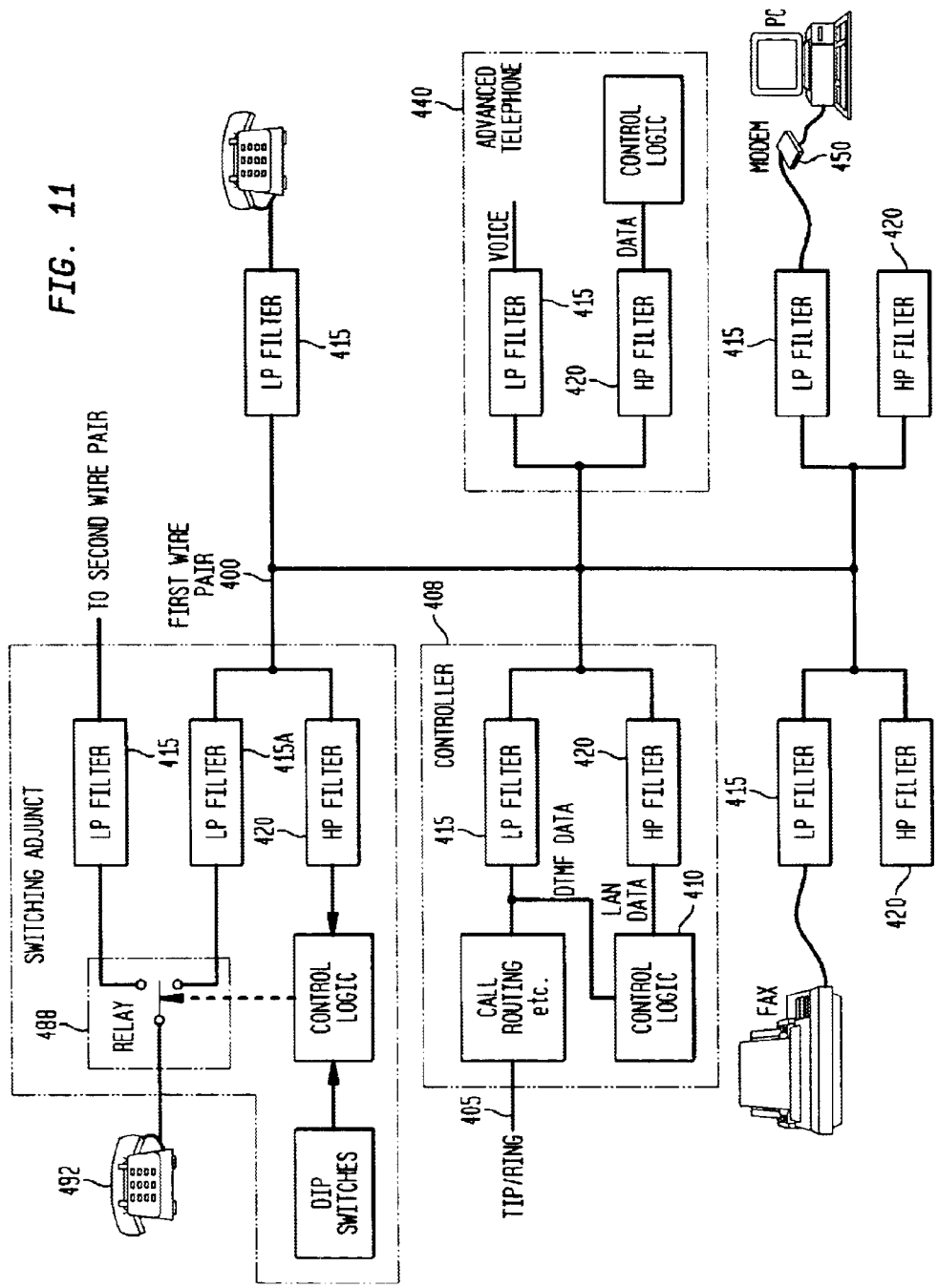
FIGS. 11 and 12 illustrate another form of the invention.
Figure 12:
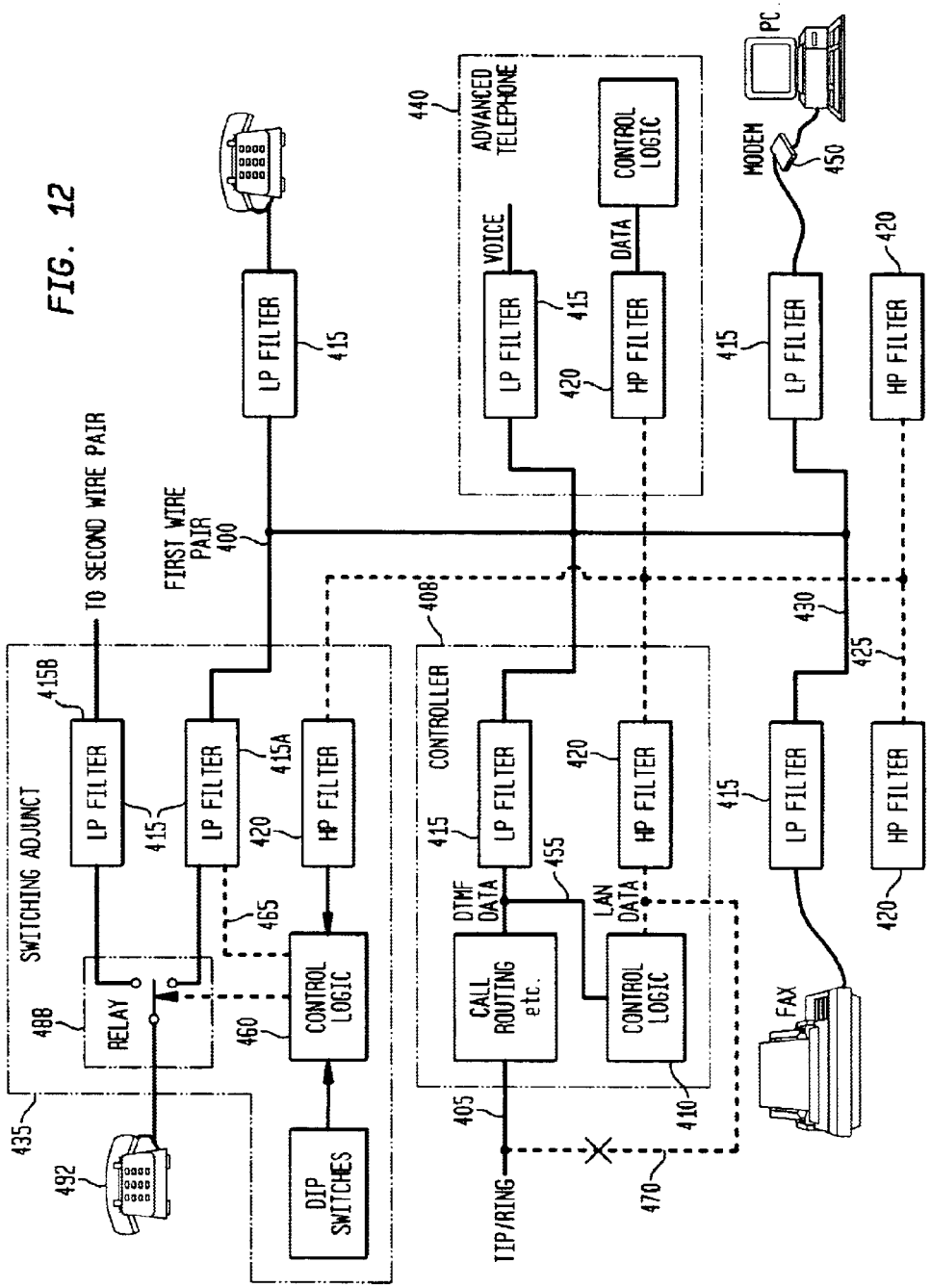

FIG. 11 illustrates another form of the invention. A first wire pair 400 is installed in a residence. In FIG. 11, telephone service is supplied by TIP/RING lines 405, which emanate from a telephone central office (not shown). The low-pass filters 415 and the high-pass filters 420 divide the wire pair 400 into two bands: a voice band and a data band, as discussed above. FIG. 12 provides a schematic illustration of the situation.

In FIG. 12, all of the high-pass filters 420 are, in effect, connected by the channel indicated by dashed line 425. All of the low-pass filters 415 are, in effect, connected by the channel indicated by solid line 430. With this arrangement, the high-pass filters 420 can share a Local Area Network, LAN, and the low-pass filters 415 can share a voice channel.

For example, the following four components can share the LAN: (1) the switching adjunct 435, (2) the controller 408, (3) an advanced telephone 440, and (4) the personal computer, PC. All of them can "listen" for a message presented on the LAN, in the usual manner, and take appropriate action in response.

The LAN can be managed by software such as that sold under the trade name of ETHERNET, but running under a slower clock rate than normal, to accommodate the bandwidth of the data channel 425.

With the arrangement shown in FIGS. 11 and 12, both a data channel and a voice channel can be maintained on the first wire pair. This arrangement is called "data over voice," because, when compared with the voice band, the data band lies at a higher frequency range, which is "over" that of the voice band.

Data can also be transferred within the voice band, as indicated by the low-pass filter 415 connected to the FAX machine, and by the modem 450 connected to the computer PC. In addition, another type of data can be transmitted in the voice band, in the form of DTMF signals, as indicated by line 455 within the controller 408. These DTMF signals can be used as control signals, for controlling the control logic 460 within the switching adjunct 435. In this case, the control logic 460 would be connected to the voice channel, via dashed line 465.

Therefore, to recapitulate:

Two channels are created in the first wire pair: a voice channel, approximately in the range of zero to 3500 Hz, and a data channel, approximately in the range of 10,000 to 500,000 Hz.

Individual devices may use one, or both, of the channels. For example, the computer PC may use both, if, for example, the high-pass filter 420 were connected to its serial port.

Control signals, in the form of DTMF signals, may be transmitted on the voice channel. These signals will cause a small amount of interference with voice communication, which is considered acceptable because of their assumed brief duration, and infrequent occurrence. Control signals can also be transmitted over the data channel. However, in this case, care must be taken that the data channel is not being used at that time, because the control signals can corrupt data being transmitted over the data channel. That is, the electronic equipment using the data channel cannot suppress the control signals, in the same manner that humans using the voice channel can suppress the DTMF signals.

The voice channel 430 can carry data signals, such as modem signals and facsimile signals.

The data channel 425 is isolated from the TIP/RING lines 405, as indicated by the "X" over line 470, but the voice channel is not so isolated.

The switching adjunct 435 and the controller 408 are designed to implement the functions discussed previously, such as in the Borg-patent. For example, control signals issued by the controller 408 can address the switching adjunct 435, and order the adjunct 435 to switch its relay 488 such that low-pass filter 415A connects with telephone 492. In this manner, the telephone 492 connects with voice channel 430 in FIG. 12. Conversely, the relay 488 can be ordered to a position in which the telephone 492 is connected with the voice channel of the second wire pair, through low-pass filter 415B.

In addition, the relay 488 within the switching adjunct 435 can switch between a low-pass filter 415 and a high-pass filter 420 (not shown in FIG. 12), with both filters connected to the same wire pair. Thus, the adjunct 435 can switch between the voice channel and the data channel of the wire pair. Or the relay 488 of the adjunct 435 can switch between two high-pass filters 420, one of which connects to one wire pair, and the other of which connects to another wire pair.

Figure 8:
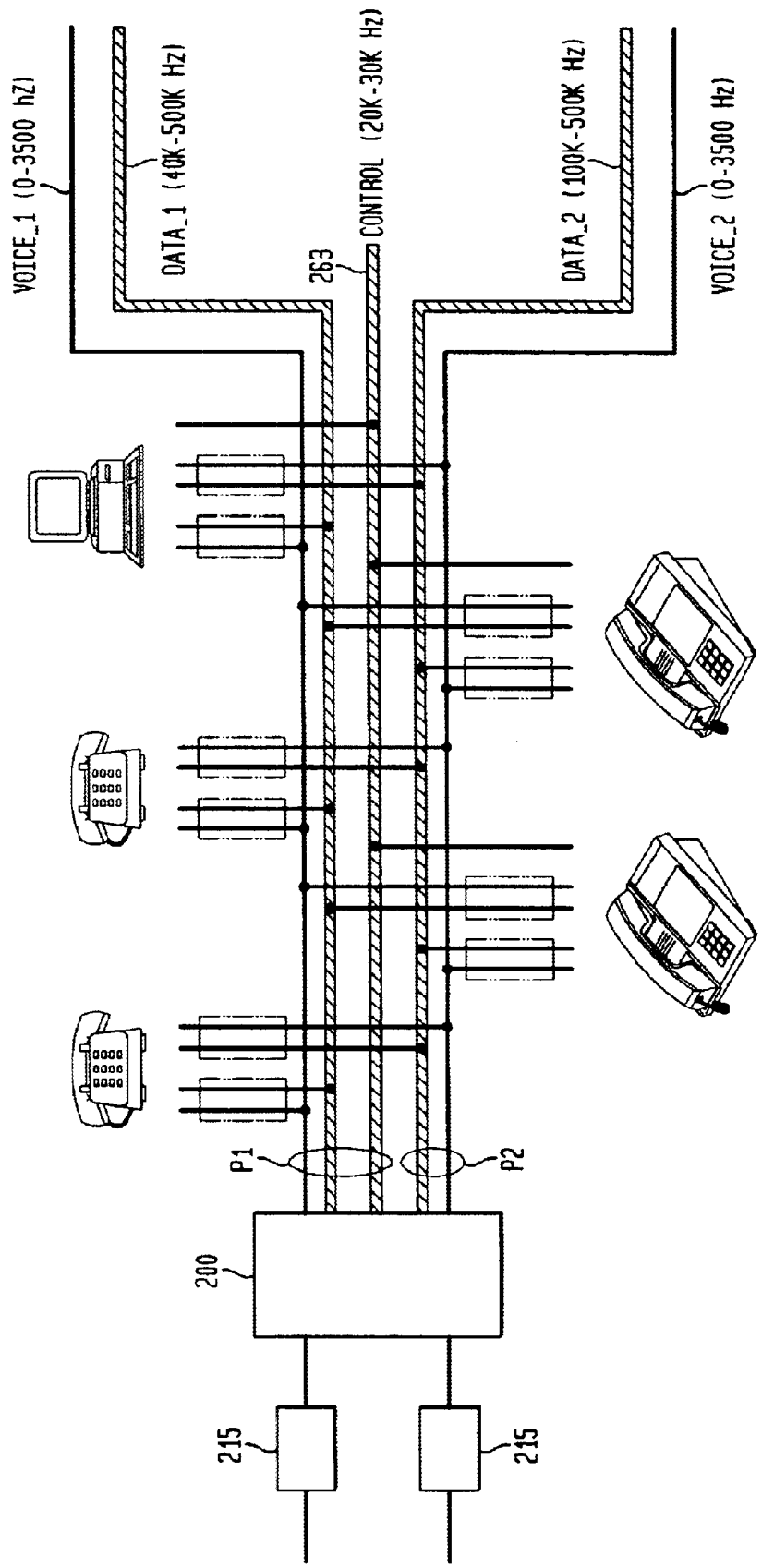
FIG. 8 illustrates five channels, one of which is used to carry control signals, derived from the two pairs P1 and P2 of FIG. 2.
Figure 9:
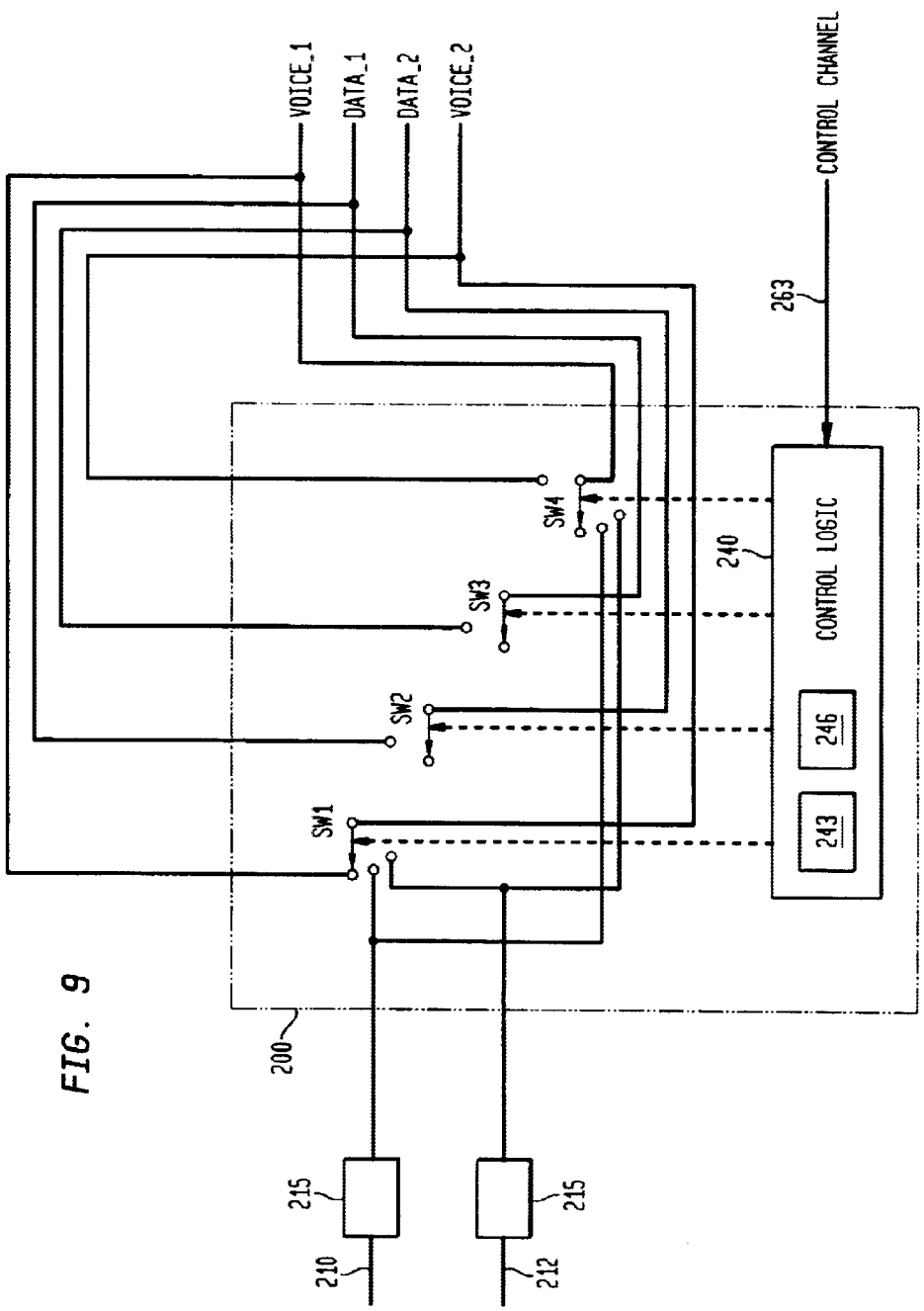
FIG. 9 illustrates the control channel of FIG. 5, leading to control logic 240 within the controller 200.

In the discussion above, the control signals (eg, the ATTENTION, CALLING DEVICE, and DESTINATION DEVICE signals) were carried on the voice channels, as indicated in FIG. 4. However, if these voice channels are in-use, as explained above, these signals may cause a disturbance. To reduce this disturbance, part of the bandwidth of one of the pairs P1 or P2 may be devoted to a control channel. FIG. 8 illustrates one embodiment. The control channel is placed into the bandwidth ranging from 20K to 30K Hz, as indicated, of pair P1. The data channel of pair P1 now ranges from 40K Hz to 500K Hz, as indicated. The voice channel of P1 is unchanged, and both the voice and data channels of pair P2 are also unchanged. FIG. 9 illustrates this control channel 263 feeding the control logic 240 of FIG. 4.

Figure 10:
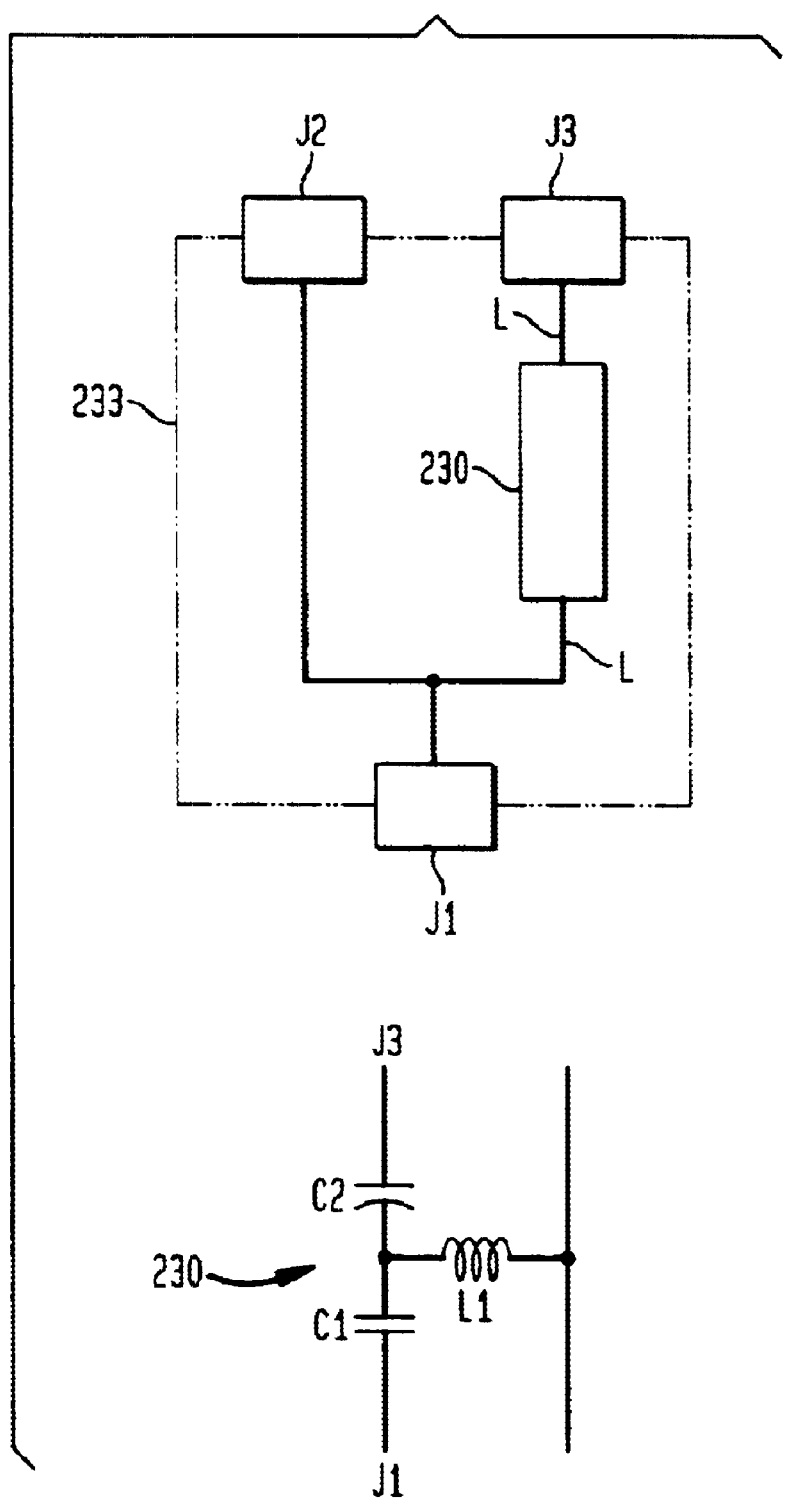
FIG. 10 illustrates one form of the invention, in the form of device 233 of FIG. 2.

Another consideration is that other types of filtering beside that using filter 230 in FIG. 2 can be used. In one form of the invention, each pair P1 and P2 is to be divided into two bands, one from zero Hz to about 3500 Hz, and the other from about 10K to about 500K Hz. A low pass filter can accomplish the former, and a high-pass filter can accomplish the latter. Either can be used, or both in combination can be used. Bandpass filters can also be used. Moreover, filter 230 in FIGS. 2 and 10 is bi-directional, and can take the form indicated in FIG. 10.

In FIG. 2, the incoming telephone cable may provide only a single active voice-grade line, such as on line 210. Thus, downstream of controller 200, four channels are available for the telephonic devices, but only a single voice-grade channel, on line 210.

Additional features can be added to the adjunct 270. Additional channels can be handled, by adding filters such as that labeled FN in FIG. 6. For example, if filters F1 and FN are band-pass filters having pass-bands of 10K–250K, and 260K–500K Hz, respectively, then six channels total become available: these two bands, plus the voice band, for each pair P1 and P2.

In addition, residential wiring containing four wires was discussed above. Of course, these four wires can be selected from those in a cable containing more than four wires, if a residence is wired with such a cable.

The switching adjunct of FIG. 6 is intended to be quite inexpensive. It contains a single filter F1, which is used in two data channels (although only a single data channel is used at any one time). Preferably, filter F2 is not present, and the control signals are carried by the voice channel of pair P2. The address of the adjunct is generated by a DIP switch, which is an inexpensive item. Electrical power is derived from pair P2, and regulated by the block POWER.

Many standard telephones are band-limited. That is, they do not respond to signals outside their bandwidth, which ranges from about zero Hz to about 3500 Hz. As a result, a filter 230 in FIG. 2 may not be necessary for telephones T1 and T2; these telephones can be connected directly to one of the pairs P1 and P2, and they automatically block frequencies outside their bandwidths.

In addition, FIG. 10 illustrates one form of the invention. A housing 250 contains three modular telephone jacks J1–J3, such as type RJ-11. Jack J1 acts as an input jack, and jacks J2 and J3 act as an output jacks. Lines L connect the jacks. Jack J2 carries the voice signal, and jack J3 carries the data signal. A high-pass filter 230, having a low-end cut-off at 10K Hz, is interposed between jack J1 and jack J3.

Figure 1:
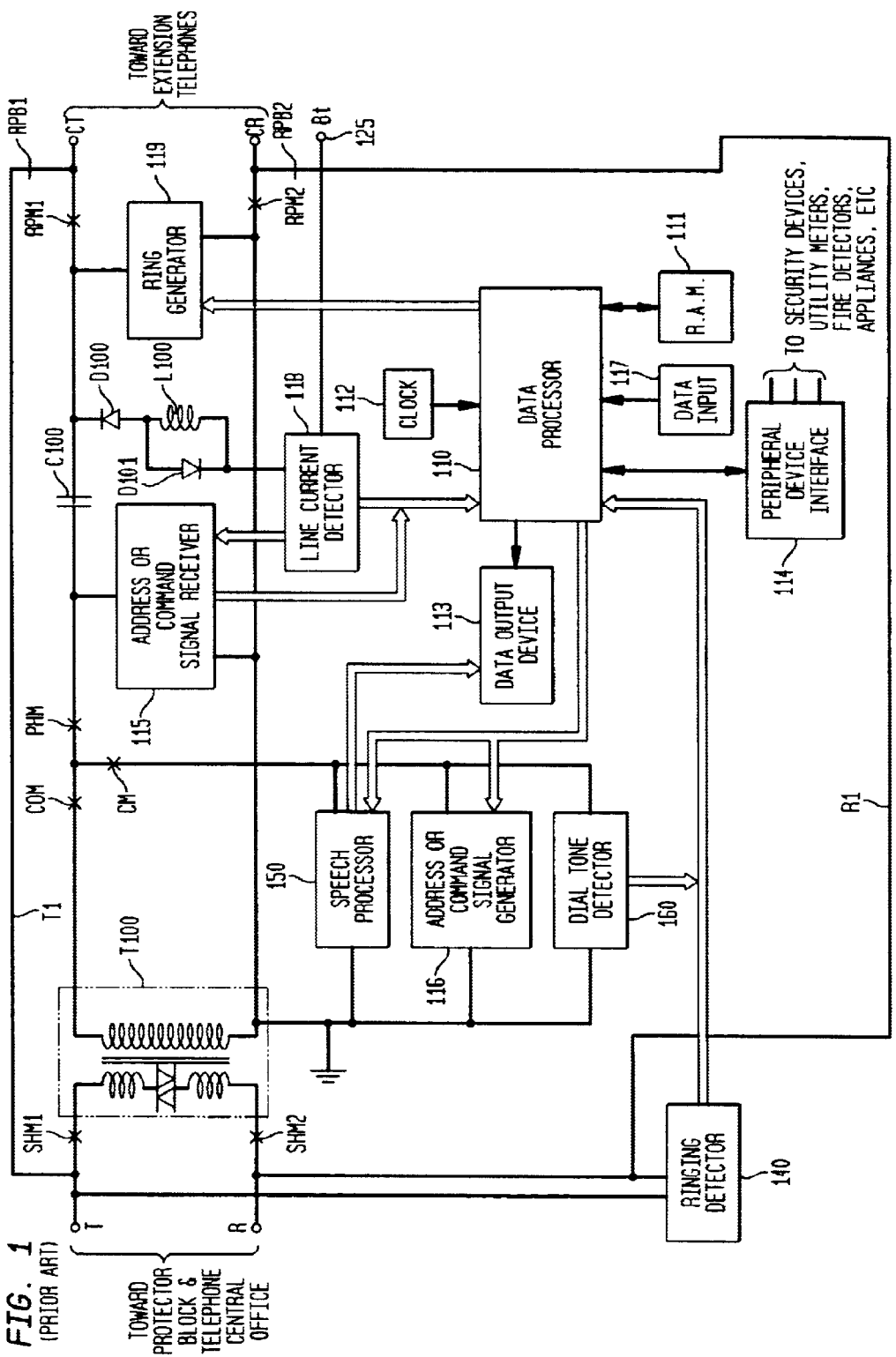
FIG. 1 is a schematic diagram of a conventional control system.

The Borg patent suggests using a Texas Instruments Model TMS 7040 microprocessor as the data processor 110 in FIG. 1. However, subsequent to the filing date of the Borg patent (ie, 1982), enormous advances have been made in the technology of microprocessors and solid state devices generally. Consequently, it may be desirable to replace some of the logic of FIG. 1 by a single-board computer which implements an architecture designed go around the 8xx86 microprocessor series manufactured by INTEL Corporation, Santa Clara, Calif. Such single-board computers are commercially available, as from Octagon Systems, 6510 West 91st Avenue, Westminister, Colo. The architecture implemented by many of these computers is commonly known as the "Personal Computer" architecture.

Also, the Borg patent discusses using mechanical relays as switches. The switches SW1 in FIG. 4 preferably take the form of commercially available solid-state devices.

The program PROG can take the form of data burned into an integrated circuit which is manually replaceable, as by inserting into a zero-insertion-force (ZIF) socket (not shown). Alternately, the PROCESSOR can be given access to a serial port 390, which is compatible with the data protocol used by the ubiquitous personal computer (PC). A new program PROG can be downloaded to the adjunct 270 by the PC.

The protocol by which data is transmitted on the data channels can take the form of a commercially available ETHERNET, originally conforming to IEEE standard 802, but modified to run at a slower data rate, such as 100,000 bits per second, to accommodate the bandwidth of the data channels indicated in FIG. 3.

The term "baseband," in connection with telephone voice communication, refers to the frequency band running from about zero Hz to about 3500 Hz. The spectral components within the baseband correspond to those in the speech signal, in the same frequency band, carried-by the baseband. These components have not been shifted in frequency.

The term "wire pair" is used, and refers to two physical wires, such as the TIP and RING wires used by telephones. Frequently, in schematic diagrams, a wire pair is represented by a single wire, with the other wire implied, or assumed to be represented as ground.

Numerous substitutions and modifications can be undertaken without departing from the true spirit and scope of the invention. What is desired to be secured by Letters Patent is the invention as defined in the following claims.

What is claimed is:

1. For a building which contains wiring coupled to an external network, a communication system comprising:
   a voice channel on the wiring coupled to exchange signals with the external network; and
   a data channel on the wiring configured to pass signals within the building, the data channel being different from the voice channel and isolated from the external network,
   wherein at least one wire of the wiring supports the voice channel and the data channel simultaneously.

2. The communication system of claim 1 further comprising:
   a first communication system, within the building, coupled to the wire pair; and
   a second communication system, within the building, coupled to the wire pair.

3. The communication system of claim 2 wherein the first communication system is adapted to transmit data in the data channel.

4. The communication system of claim 3 wherein the second communication system is adapted to receive the data.

5. The communication system of claim 3 wherein the second communication system is adapted to receive voice communication via the voice channel when the first communication system is transmitting the data.

6. The communication system of claim 1 further comprising a filter coupled between the external network and the twisted pair.

7. The communication system of claim 1 wherein the voice channel occupies a first frequency band and the data channel occupies a second frequency band different from the first frequency band.

8. The communication system of claim 7 wherein the first frequency band is lower than the second frequency band.

9. The communication system of claim 8 further comprising a second data channel different from the first data channel and the voice channel.

10. The communication system of claim 9 wherein the second data channel occupies a third frequency band different from the first and second frequency bands.

11. The communication system of claim 1 further comprising a second data channel different from the first data channel and the voice channel.

12. The communication system of claim 1 further comprising a communication device coupled to the telephone wiring pair, the communication system adapted to receive first data from the data channel and adapted to transmit second data in the voice channel.

13. The communication system of claim 6 further comprising:
- a first communication device, within the building, coupled to the wiring and configured to exchange data via the data channel; and
- a second communication device, within the building, coupled to the wiring and configured to exchange voice communications via the voice channel.

14. A communication system for a building comprising:
- a first wire pair having a first voice channel and a first data channel different from the voice channel, the first voice channel and first data channel supported simultaneously on the wire pair;
- a second wire pair having a second data channel;
- a third wire pair having a second voice channel; and
- a jack electrically coupled to the first wire pair, the second wire pair, and the third wire pair,
  - wherein the jack electrically 1) couples the first data channel to the second data channel, 2) couples the first voice channel to the second voice channel, and 3) isolates the first voice channel and second voice channel from the first data channel.

15. The communication system of claim 1; wherein the jack comprises:
- a first port configured to accept the first wire pair;
- a second port configured to accept the second wire pair;
- a third port configured to accept the third wire pair; and
- a circuit, wherein the circuit electrically 1) couples the first port and the second port to carry the data channel, 2) couples the first port and third port to carry the voice channel, and 3) isolates the voice channel in the first port from the data channel in the second port.

16. A device comprising:
- a first port configured to accept a first wire pair supporting both a data channel and a voice channel simultaneously;
- a second port configured to accept a second wire pair supporting the voice channel; and
- a third port configured to accept a third wire pair supporting the data channel and suppressing the voice channel, and
- a circuit, wherein the circuit electrically 1) couples the first port and the second port to carry the voice channel, 2) couples the first port and third port to carry the data channel, and 3) isolates the voice channel in the first port from the data channel in the third port.

17. The device of claim 6 wherein the second wire pair carries a second data channel.

18. The device of claim 16 wherein the data channel occupies a frequency band above 10,000 Hz and the voice channel occupies a frequency band ranging from near zero Hz to near 10,000 Hz.

* * * * *

UNITED STATES PATENT AND TRADEMARK OFFICE
CERTIFICATE OF CORRECTION

PATENT NO. : 6,633,589 B1
DATED : October 14, 2003
INVENTOR(S) : James Joseph Hartmann and Thomas Anthony Stahl It is certified that error appears in the above-identified patent and that said Letters Patent is hereby corrected as shown below:

<u>Column 11,</u>
Line 12, replace "claim 6" with -- claim 1 --.

<u>Column 12,</u>
Line 1, replace "claim 1" with -- claim 14 --.
Line 27, replace "claim 6" with -- claim 16 --.

Signed and Sealed this

Second Day of March, 2004

JON W. DUDAS
*Acting Director of the United States Patent and Trademark Office*